(12) United States Patent
Kintscher et al.

(10) Patent No.: US 12,522,411 B2
(45) Date of Patent: Jan. 13, 2026

(54) CONTAINER CLOSURE WITH A SEALING ELEMENT

(71) Applicant: SILGAN HOLDINGS INC., Stamford, CT (US)

(72) Inventors: Juergen Kintscher, Wedemark (DE); Andreas Maniera, Neustadt (DE)

(73) Assignee: SILGAN HOLDINGS INC., Stamford, CT (US)

( * ) Notice: Subject to any disclaimer, the term of this patent is extended or adjusted under 35 U.S.C. 154(b) by 856 days.

(21) Appl. No.: 17/756,155

(22) PCT Filed: Nov. 18, 2020

(86) PCT No.: PCT/IB2020/060850
§ 371 (c)(1),
(2) Date: Dec. 20, 2022

(87) PCT Pub. No.: WO2021/099951
PCT Pub. Date: May 27, 2021

(65) Prior Publication Data
US 2023/0108939 A1    Apr. 6, 2023

(30) Foreign Application Priority Data
Nov. 18, 2019 (DE) ...................... 10 2019 131 078.4

(51) Int. Cl.
*B65D 53/02* (2006.01)
*B65D 43/02* (2006.01)
(Continued)

(52) U.S. Cl.
CPC ......... *B65D 53/02* (2013.01); *B65D 43/0231* (2013.01); *B65D 51/145* (2013.01);
(Continued)

(58) Field of Classification Search
CPC .. B65D 53/02; B65D 43/0231; B65D 51/145; B65D 2543/00092; B65D 2543/00537;
(Continued)

(56) References Cited

U.S. PATENT DOCUMENTS 5,476,914 A   12/1995  Ewen et al.
8,552,117 B1  10/2013  Lee et al.
(Continued)

FOREIGN PATENT DOCUMENTS

CN   101412450 A    4/2009
EP     2248852 A1  11/2010
(Continued)

OTHER PUBLICATIONS

International Search Report, dated Mar. 17, 2021, from corresponding International Application No. PCT/IB2020/060850.
(Continued)

*Primary Examiner* — Michael C Miggins
(74) *Attorney, Agent, or Firm* — HUNTON ANDREWS KURTH LLP

(57) ABSTRACT

A vessel closure (1, 21, 41, 61) includes a sealing element (3, 23, 43, 63). The sealing element (3, 23, 43, 63) includes a polymer composition. The polymer composition includes a polysiphaolefin with kinematic viscosity, determined according to ASTM D445/ISO 3104, of at least 4 cSt, at a temperature of 100° C., and/or a dropping point, determined according to ASTM 5950, of at most −10° C., and up to 95% by weight of a second polyolefin.

17 Claims, 6 Drawing Sheets

(51) Int. Cl.
*B65D 51/14* (2006.01)
*C08L 23/04* (2006.01)
*C08L 23/0807* (2025.01)
*C08L 23/16* (2006.01)
*C08L 23/20* (2025.01)
*C08L 53/00* (2006.01)
*C09K 3/10* (2006.01)

(52) U.S. Cl.
CPC ............ *C08L 23/04* (2013.01); *C08L 23/0815* (2013.01); *C08L 23/16* (2013.01); *C08L 23/20* (2013.01); *C08L 53/00* (2013.01); *C09K 3/1006* (2013.01); *B65D 2543/00092* (2013.01); *B65D 2543/00537* (2013.01); *C08L 2207/066* (2013.01)

(58) Field of Classification Search
CPC ...... B65D 43/0283; B65D 2543/00277; B65D 2543/00527; B65D 2543/00574; B65D 2543/00972; C08L 23/04; C08L 23/0815; C08L 23/16; C08L 23/20; C08L 53/00; C08L 2207/066; C08L 2201/14; C08L 2203/10; C08L 2205/03; C08L 2207/324; C09K 3/1006

See application file for complete search history.

(56) References Cited

U.S. PATENT DOCUMENTS

| | | |
|---|---|---|
| 2005/0148720 A1 | 7/2005 | Li et al. |
| 2006/0189744 A1 | 8/2006 | Tse et al. |
| 2008/0221274 A1 | 9/2008 | Jourdain |
| 2016/0009909 A1 | 1/2016 | Lopez |
| 2018/0346621 A1 | 12/2018 | Machini et al. |

FOREIGN PATENT DOCUMENTS

| | | |
|---|---|---|
| JP | S54155253 A | 12/1979 |
| WO | 2002031044 A1 | 4/2002 |
| WO | 2006128646 | 12/2006 |
| WO | 2007120147 A1 | 10/2007 |
| WO | 2016188982 | 12/2016 |
| WO | 2017025268 A1 | 2/2017 |

OTHER PUBLICATIONS

Written Opinion of the International Searching Authority, dated Mar. 17, 2021, from corresponding International Application No. PCT/IB2020/060850.

CONTAINER CLOSURE WITH A SEALING ELEMENT

The invention involves a vessel closure, such as a screw closure, with a sealing element. The invention also involves a vessel which is closed with such a vessel closure or is filled and closed in a process in order to produce a closed and filled vessel.

PVC-free sealing elements for state of the art vessel closures often contain white oil as a component, which is liquid at ambient conditions. White oil is used in the sealing element compositions to reduce the hardness of the sealing elements, improve the processability of the compositions and reduce the overall cost of the sealing element.

If the sealing element of a vessel closure contains white oil and the vessel closure closes a vessel filled with a foodstuff, the total migration into the foodstuff is increased. In particular, total migration is significantly increased if the foodstuff has a high fat or oil content.

One task of the invention is to provide a polymer composition which can be used as a sealing element in a vessel closure, which has relatively low migration values and which enables the vessel closure to be used at low temperatures. Another task is to improve the processability of the polymer composition to form a sealing element.

The task is resolved by a vessel which can close a vessel and which can be used in a process for producing a closed and filled vessel.

The vessel closure includes a sealing element. The sealing element includes or comprises a polymer composition, and the polymer composition includes a polyalphaolefin and a second polyolefin. The polyalphaolefin (first polyolefin) has a kinematic viscosity of at least 4 cSt at a temperature of 100° C. The kinematic viscosity can be determined according to ASTM D 445 or ISO 3104, preferably according to ISO 3104. Additionally or alternatively, the polyalphaolefin has a dropping point of no more than −10° C. The dropping point can be determined according to ASTM 5950. The second polyolefin is present in the polymer composition at a proportion of up to 95% by weight.

The second polyolefin may be present in the polymer composition between 5% and 95% by weight, preferably between 15% and 85% by weight, more preferably between 25% and 75% by weight, even more preferably between 35% and 65% by weight.

The vascular closure may include a metal, plastic or metal and plastic carrier, whereby a metal and plastic vascular closure is also called a composite closure. If the carrier includes metal or if the carrier is made of metal, at least one side of the carrier may be coated with an adhesive lacquer to improve bonding of the sealing element to the carrier. The sealing element can be formed outside the carrier and made to adhere to the carrier, such as by pressure and/or temperature. The sealing element can also be formed on the carrier by applying a flowable polymer composition to the carrier and shaping it.

For vessel closures attached to the opening of a vessel by a screwing movement, such as cam screw closures, the sealing element is mainly positioned in the flat part of the carrier so that an upper portion of a vessel mouth defining the vessel opening contacts the sealing element when the vessel closure is applied to the vessel and closes the opening of the vessel.

The sealing element can be substantially disc-shaped or substantially ring-shaped.

Especially with press-on twist-off vessel closures (PT vessel closures), a significant portion of the sealing element is located in the apron area of the carrier. In composite PT vascular closures (e.g. the vascular closure available under the brand name Band-Guard), the vascular closure includes a plastic thread that interacts with a mating thread of a vessel.

A PT vessel closure is pressed onto the vessel mouth when closing a vessel (press-on) while the sealing element is in a heated state and sufficiently flowable. An external thread in the mouth area of the vessel creates an internal thread (as an inverse of the external thread) in the sealing element area on the apron of the vessel closure carrier. The internal thread remains after the sealing element has hardened. The PT vessel closure is removed from the vessel by a twisting movement (twist-off).

The polyalphaolefin of the sealing element of the vessel closure can be in liquid form (liquid in the aggregate state) at 23° C. and 1 bar.

The kinematic viscosity of the polyalphaolefin can range from 4 cSt to 1500 cSt at a temperature of 100° C. Specifically, the kinematic viscosity of the polyalphaolefin at a temperature of 100° C. is between 50 cSt and 1000 cSt or between 120 cSt and 1000 cSt. Most preferably, the kinematic viscosity of the polyalphaolefin at a temperature of 100° C. is between 250 cSt and 1000 cSt. Also, the kinematic viscosity of the polyalphaolefin at 100° C. may be at least 250 cSt. The kinematic viscosity of the polyalphaolefin can be at most 1500 cSt at a temperature of 100° C.

The kinematic viscosity of the polyalphaolefin at a temperature of 100° C. may also be between 2 cSt and 10 cSt, between 55 cSt and 75 cSt, between 140 cSt and 160 cSt, between 280 cSt and 320 cSt or between 900 cSt and 1100 cSt.

The dropping point (determined according to ASTM 5950) can be no more than −20° C. Specifically, the dropping point of polyalphaolefin is at most −30° C.

The density of the polyalphaolefin of the polymer composition can be up to 0.860 g cm$^{-3}$. Specifically, the density of polyalphaolefin is between 0.825 g cm$^{-3}$ and 0.855 g cm$^{-3}$. Also, the density of polyalphaolefin can range from 0.840 g cm$^{-3}$ to 0.855 g cm$^{-3}$.

The average molecular weight Mw of the polyalphaolefin may be at least 440 Da. Specifically, the average molecular weight Mw of polyalphaolefin is between 440 Da and 12000 Da or between 1000 Da and 10000 Da. Most preferably, the average molecular weight Mw of polyalphaolefin is between 3000 Da and 10000 Da.

The polyalphaolefin may be a metallocene polyalphaolefin. The polyalphaolefin may have been produced by the application of a metallocene catalyst.

The polyalphaolefin may be a Ziegler-Natta polyalphaolefin. The polyalphaolefin may have been produced by the application of a Ziegler-Natta catalyst.

The polyalphaolefin may be a homopolymer or a copolymer.

Specifically, the polyalphaolefin is a homopolymer of a $C_3$ to $C_{22}$ alpha-olefin. Thus, to produce the polyalphaolefin as a homopolymer, alpha-olefins of length $C_3$ to $C_{22}$ are used as monomers. Preferably used for the polyalphaolefin are $C_6$ to $C_{14}$ alpha-olefins as a homopolymer or C to $C_{10}$ alpha-olefins as monomers.

The polyalphaolefin may be an alpha-octene homopolymer or an alpha-decene homopolymer, preferably an alpha-decene homopolymer.

As a copolymer, the polyalphaolefin comprises at least two different alpha-olefins of length $C_3$ to $C_{22}$ as comonomers. Specifically, two different alpha-olefins of length $C_6$ to $C_{14}$ or $C_8$ to $C_{10}$ are used as comonomers.

The polyalphaolefin may be a bipolymer.

The polyalphaolefin can be a synthetic fluid (at 23° C. and 1 bar); in particular, the polyalphaolefin is a completely synthetic fluid (at 23° C. and 1 bar).

The polyalphaolefin may be hydrogenated; in particular, the polyalphaolefin is completely hydrogenated.

The polyalphaolefin may be a mixture of different types of polyalphaolefins. For example, the polyalphaolefin may be a mixture of at least two polyalphaolefins that differ in their kinematic viscosity and/or in their (co)monomers. To this end, at least two of the polyalphaolefins disclosed herein may be present as a mixture.

The polyalphaolefin may be present in the polymer composition at a proportion of up to 65% by weight. In general, weight percentages refer to the total mass of the polymer compositions. In particular, the proportion of polyalphaolefin in the polymer composition is between 3% and 65% by weight or between 3% and 50% by weight. More specifically, the proportion of polyalphaolefin in the polymer composition may be between 3% and 30% by weight or between 5% and 30% by weight.

The proportion of polyalphaolefin in the polymer composition may be between 3% and 7% by weight, between 7% and 12% by weight, between 14% and 20% by weight, between 17% and 23% by weight, between 27% and 33% by weight or between 35%, and 45% by weight.

The second polyolefin in the polymer composition is different from the polyalphaolefin. For example, different types of polymers may differ in their structure (e.g. (co) monomers of the polymers) or by at least one property (e.g. hardness, density).

The second polyolefin may have a Shore A hardness of at most 90 at 23° C. (DIN ISO 7619-1; holding time 15 s). In particular, the Shore A hardness at 23° C. is between 30 and 90.

The second polyolefin may be a plastomer or an elastomer.

Specifically, the second polyolefin is a polyolefin elastomer having a density (DIN EN ISO 1183-1) between 0.860 g cm$^{-3}$ and 0.889 g cm$^{-3}$.

The second polyolefin may also be a polyolefin plastomer, whereby the density is between 0.890 g cm$^{-3}$ and 0.910 g cm$^{-3}$.

The second polyolefin may be an elastomer with a density of less than 0.860 g cm$^{-3}$. In particular, the elastomer has a density between 0.780 g cm$^{-3}$ and 0.859 g cm$^{-3}$ or between 0.800 g cm$^{-3}$ and 0.859 g cm$^{-3}$.

The second polyolefin may be a plastomer with a density of at most 0.910 g cm$^{-3}$. In particular, the plastomer has a density between 0.860 g cm$^{-3}$ and 0.910 g cm$^{-3}$.

The second polyolefin may be a copolymer, in particular a random copolymer. Specifically, the second polyolefin is a copolymer including alpha-butene and a $C_2$, $C_3$ or $C_5$ to $C_{16}$ (alpha-) olefin as a comonomer.

The proportion of alpha-butene in the copolymer may be more than 50 mol %. Specifically, the proportion of alpha-butene in the copolymer is at least 60 mol % or at least 80 mol %.

The second polyolefin may be a copolymer, in particular a random copolymer—of propene and a $C_2$, $C_4$ or $C_5$ to $C_{16}$ (alpha-)olefin.

The proportion of propene in the copolymer may be more than 50 mol %. In particular, the proportion of propene in the copolymer may be greater than 60 mol % or greater than 70 mol %.

The second polyolefin may be a copolymer—in particular a random or block copolymer—including ethene and a $C_5$ to $C_{16}$ (alpha-)olefin as a comonomer. Specifically, one comonomer of the copolymer is ethene and another comonomer of the copolymer is a $C_5$, $C_7$, $C_9$ or $C_{10}$ to $C_{16}$ alpha-olefin.

The proportion of ethene in the copolymer may be more than 50 mol %. Specifically, the proportion of ethene in the copolymer is at least 60 mol % or at least 70 mol %.

Generally, the second polyolefin may be a bipolymer.

Particularly preferably, the second polyolefin is an alpha-butene-ethylene copolymer, whereby alpha-butene is present at more than 50 mol % in the copolymer, in particular as a bipolymer.

Equally preferably, the second polyolefin is an alpha-butene-propene copolymer (bipolymer) having a molar content of alpha-butene in the copolymer of greater than 50 mol %.

The second polyolefin may have a weight proportion in the polymer composition of at most 80% by weight. Specifically, the proportion of the second polyolefin in the polymer composition is at most 70% by weight.

In the polymer composition, the second polyolefin may also have a proportion between 5% and 95% by weight. More specifically, the proportion of the second polyolefin in the polymer composition is between 20% and 95% by weight or between 50% and 95% by weight.

The second polyolefin may be present in the polymer composition in an amount between 55% and 70% by weight. Also, the second polyolefin may be present in the polymer composition between 83% and 93% by weight.

The polymer composition may include a third and/or fourth polymer (two polymers), whereby the third and fourth polymers are different from the polyalphaolefin and the second polyolefin, and the third polymer is different from the fourth polymer. The polyalphaolefin, the second polyolefin, the third polymer and the fourth polymer are therefore each different polymers.

The third and/or fourth polymer may be a polyolefin. The third and/or fourth polymer may have a Shore D hardness of 60 or less (DIN ISO 7619-1; holding time 15 s) at 23° C. Specifically, the Shore D hardness of the third and/or fourth polymer is between 20 and 60.

The third and/or fourth polymer may be a homopolymer. Specifically, the third and/or fourth polymer is a homopolymer composed of a $C_2$ to $C_{12}$ alpha-olefin. The third and/or fourth polymer as a homopolymer may include a $C_2$ to $C_8$ alpha-olefin or a $C_2$ to $C_6$ alpha-olefin as a monomer.

It is particularly preferred that the third and/or fourth polymer is a polyethylene homopolymer (e.g. LDPE), a polypropylene homopolymer or an alpha-butene homopolymer.

The polypropylene homopolymer may be a syndiotactic polypropylene homopolymer. In particular, the degree of syndiotacticity (syndiotactic index) of the polypropylene homopolymer may be at least 75%. The degree of syndiotacticity (syndiotactic index) can be determined by NMR, IR or GPC according to the methods described in U.S. Pat. No. 5,476,914 B, preferably by NMR.

The third and/or fourth polymer may be a copolymer.

Preferably, the third and/or fourth polymer is a polypropylene copolymer. The polypropylene copolymer may be a syndiotactic polypropylene copolymer. The polypropylene copolymer may have a propylene content of at least 60 mol %, in particular at least 75 mol %, more preferably at least 90 mol %, even more preferably at least 95 mol %, most preferably at least 98 mol %.

The polypropylene copolymer preferably includes the monomers ethylene and propylene. Ethylene may be present in the propylene copolymer in a proportion not exceeding 2 mol %.

The degree of syndiotacticity of the polypropylene copolymer may be at least 75%.

The third and/or fourth polymer as a copolymer may include at least one or at least two (different) $C_2$ to $C_{12}$ alpha-olefins as comonomers. Specifically, the third and/or fourth polymer as a copolymer is composed of at least one or at least two (different) $C_2$ to $C_8$ alpha-olefins or $C_2$ to $C_6$ alpha-olefins.

The third and/or fourth polymer may be a bipolymer.

Most preferably, the third and/or fourth polymer is a propene-ethylene copolymer (bipolymer), whereby in particular the proportion of propene is higher than 50 mol %.

Also, the third and/or fourth polymer as a copolymer may be a propene-alpha-hexene copolymer (bipolymer), whereby the proportion of propene in the copolymer is more than 50 mol %.

The third and/or fourth polymer may each be present in the polymer composition in an amount not exceeding 35% by weight. The third and/or fourth polymer may each be present in the polymer composition at between 5% and 35% by weight or between 5% and 27% by weight. Specifically, the proportion of the third and/or fourth polymer is in each case between 5% and 18% by weight or between 11% and 18% by weight.

The MFI (mass flow index) of the polymer composition may be less than 30 g/10 min, especially less than 10 g/10 min, particularly preferably less than 5 g/10 min, the MFI being determined according to DIN EN ISO 1133 at 190° C. and 2.16 kg.

The polymer composition may be a polyolefin composition such that the polymer composition exclusively includes polyolefins as polymeric components, whereby additives may be included in the polymer composition as non-polyolefins.

The polymer composition may be free of PVC (polyvinyl chloride).

In one embodiment, the polymer composition may be free of a copolymer with styrene as a comonomer.

The polymer composition may contain a maximum of 10% by weight of a mineral oil, such as white oil; preferably the polymer composition contains a maximum of 5% by weight of a mineral oil; particularly preferably the polymer composition is free of a mineral oil.

The polymer composition may contain up to 15% by weight of additives. In particular, up to 8% by weight of additives are contained in the polymer composition, particularly preferably a maximum of 6% by weight of additives, most preferably a maximum of 5% by weight of additives.

Additives in the polymer composition may be selected from the group consisting of pigments, nucleating agents, brighteners, stabilisers, surfactants, lubricants, antioxidants and combinations thereof.

It is preferred that the polymer composition does not contain an oxygen scavenger.

The polymer composition may have a static coefficient of friction (determined according to DIN EN ISO 8295) of at most 0.50, in particular a static coefficient of friction of at most 0.40). Specifically, the static coefficient of friction of the polymer composition is between 0.10 and 0.40 or between 0.15 and 0.40.

The oxygen transmission rate of the polymer composition may be at most 1300 $cm^3$ $m^{-2}$ $d^{-1}$ $bar^{-1}$, preferably at most 900 $cm^3$ $m^{-2}$ $d^{-1}$ $bar^{-1}$, more preferably at most 750 $cm^3$ $m^{-2}$ $d^{-1}$ $bar^{-1}$. Particularly preferably, the oxygen transmission rate of the polymer composition is between 300 $cm^3$ $m^{-2}$ $d^{-1}$ $bar^{-1}$ and 1300 $cm^3$ $m^{-2}$ $d^{-1}$ $bar^{-1}$ or between 300 $cm^3$ $m^{-2}$ $d^{-1}$ $bar^{-1}$ and 900 $cm^3$ $m^{-2}$ $d^{-1}$ $bar^{-1}$.

The oxygen transmission rate can be measured according to DIN 53380. The rate of oxygen permeability of the polymer composition in the vessel closure has an influence on the possible storage time of a vessel closed with the vessel closure and filled with a foodstuff.

The total migration of the polymer composition may be at most 5.50 mg $cm^{-2}$, preferably at most 3.50 mg $cm^{-2}$, more preferably at most 2.50 mg $cm^{-2}$, even more preferably at most 1.50 mg $cm^{-2}$. The total migration of the polymer composition may be determined according to DIN-EN 1186-14. In particular, the total migration of the polymer composition is between 0.50 mg $cm^{-2}$ and 3.00 mg cm 2 or between 0.80 mg cm 2 and 2.50 mg $cm^{-2}$.

If a filled vessel is sealed by a vessel closure with a sealing element made of the polymer composition and has a surface/mass ratio of 1 $cm^{-2}$ contact area of the sealing element to 0.02 kg mass of the filling material in the vessel, a total migration limit value of 60 mg $kg^{-1}$ is adhered to.

It is preferred that the sealing element of the vessel closure consists of the polymer composition, e.g. the sealing element does not include an additional applied film.

Different, i.e. different types of, polymers in the polymer composition can differ in their physical properties (e.g. density, melting temperature, hardness, etc.). Copolymers can also differ in their structure (block copolymer, random copolymer, etc.). Copolymers can also differ in the nature of their comonomers (ethene, propene, etc.).

The vessel closure may include a carrier and the sealing element. The carrier may include a flat section and an apron section. Specifically, the carrier may include metal, plastic or metal and plastic. In particular, the main component of the carrier is metal or plastic, especially metal.

2:5 The vessel closure may be a screw cap. Preferably, the vessel closure is a cam screw closure. The vessel closure may also be a press-on twist-off vessel closure or a composite closure.

A disclosed vessel closure may close a vessel. The vessel includes a vessel mouth and a closable opening at the end of the vessel mouth. This opening closes one of the disclosed vessel closures.

The vessel may be a glass, plastic or metal vessel. In particular, the vessel is a glass vessel.

The vessel closure that closes the opening of the vessel may include a carrier and the sealing element. The carrier may have a lower side, and the vessel mouth may have an upper end. The sealing element of the vessel closure is typically clamped between the vessel mouth and the carrier of the vessel closure so that the sealing element rests against both the upper end of the vessel mouth and the lower side of the carrier. Specifically, the height of the sealing element between the upper end of the vessel mouth and the lower side of the carrier is at most 1.0 mm. Preferably, this height is at most 0.8 mm and particularly preferably at most 0.7 mm. The height in the axial direction of the vessel may be defined.

Similarly, the height of the sealing element between the upper end of the vessel mouth and the lower side of the carrier may be at least 0.2 mm. Specifically, the height is at least 0.4 mm and particularly preferably at least 0.5 mm. The height of the sealing element may be measured in the axial direction of the vessel.

Particularly preferably, the height of the sealing element between the upper end of the vessel mouth and the lower side of the carrier is between 0.3 mm and 0.9 mm.

For example, if the height of the sealing element before applying the vessel closure to a vessel is 1.2 mm, an impression of the upper end of the vessel mouth into the sealing element (height between the upper end of the vessel mouth and the lower side of the carrier at most 1.0 mm) without the sealing element being cut through (height of the sealing element between the upper end of the vessel mouth and the lower side of the carrier at least 0.2 mm) ensures a high level of tightness when the vessel is closed with the vessel closure.

Preferably, there is a vacuum in the closed vessel. The absolute pressure in the closed vessel may be a maximum of 200 hPa. Specifically, the absolute pressure in the sealed vessel is at most 100 hPa.

The vessel closed with the vessel closure may have a safety dimension of at most 10 mm; specifically, the safety dimension is at most 8 mm. Preferably, the safety dimension is at most 6 mm. Most preferably, the safety dimension is at most 4 mm.

To determine the safety dimension, a vessel closed with a cam screw closure is stored at room temperature (23° C.) for a period of 30 minutes. The relative position of the vessel closure to the vessel is marked by placing a mark on the vessel closure apron and the vessel wall such that the circumferential distance between the mark on the vessel closure apron and the vessel wall is zero. The marks lie on a straight line that is parallel to the longitudinal axis of the vessel. The vessel closure is then completely removed from the vessel by unscrewing it. Subsequently, the vessel closure is placed on the vessel and tightened until a slight resistance is felt. The vessel closure is thus screwed on finger-tight. The circumferential distance between the mark on the vessel closure apron and the mark on the vessel wall is then measured. The measured distance corresponds to the safety dimension expressed in mm.

Due to the steep pitch, at least in sections, of the vessel threads and cam screw closures, the precision of measuring the safety dimension is high, since the point at which a slight resistance can be felt during tightening of the vessel closure (finger-tight) can be determined precisely. Typically, the precision of measuring the safety dimension on sealed vessels sealed under the same conditions by different people is about +1 mm.

A suitable safety dimension ensures that the sealing element will exert an elastic force on at least the upper end of the vessel mouth when the vessel is closed with the vessel closure. This results in a high level of tightness for the interior of the sealed vessel.

A sealed and filled vessel can be produced by providing a vessel with a vessel mouth and a sealable opening at the end of the vessel mouth. The vessel is filled with a (solid and/or liquid) foodstuff through the opening of the vessel, and the opening of the vessel is closed with a disclosed vessel closure.

The opening of the vessel may have a diameter of at least 20 mm. In particular, the diameter of the opening of the vessel is at most 120 mm.

The vessel may be a glass, plastic or metal vessel.

The vessel closure may be treated at a temperature of at least 90° C. before the opening of the vessel is sealed with the vessel closure. Such a treatment can be done with steam, for example.

A head space can be formed in the vessel after the vessel has been filled with the foodstuff. The head space in the vessel after filling is the section of the vessel's content where no foodstuff is present. Steam can be added to the head space before the vessel closure is applied to the vessel, thereby sealing the opening of the vessel. In particular, the steam can be water vapor.

The absolute pressure in the sealed and filled vessel may be at most 200 hPa. Specifically, the pressure in the sealed and filled vessel may be at most 100 hPa.

To form an impression of the vessel mouth in the sealing element, the sealing element may be deformed at least 0.2 mm in the axial direction of the vessel during closing of the opening of the vessel with the vessel closure and/or thermal treatment of the closed and filled vessel. Preferably, this deformation of the sealing element is at least 0.4 mm. Specifically, the deformation is at least 0.5 mm.

Similarly, the sealing element may be deformed by at most 1.0 mm to form an impression of the mouth of the vessel in the sealing element during closure of the opening of the vessel with the vessel closure and/or thermal treatment of the closed and filled vessel. In particular, the deformation is a at most 0.8 mm. More preferably, the deformation is at most 0.7 mm. This is done in the axial direction of the vessel.

It is particularly preferred that the deformation of the sealing element is between 0.3 mm and 0.9 mm.

The foodstuff may be filled aseptically into the vessel.

The foodstuff may also be filled into the vessel at a maximum temperature of 10° C.

The foodstuff may also be filled into the vessel at a temperature between 10° C. and 70° C.

Likewise, the food may be filled into the vessel at a temperature between 70° C. and 98° C.

Within the process, the sealed and filled vessel can be thermally treated. Here, the temperature of the thermal treatment is above the temperature of the (solid and/or liquid) foodstuff while it is being filled into the vessel.

The thermal treatment may be performed at a temperature of at least 60° C.

The thermal treatment may also be performed at a maximum temperature of 135° C. (between 60° C. and 135° C.). In particular, the thermal treatment is performed at a temperature of up to 135° C. (between 60° C. and 135° C.) at an absolute ambient pressure of at most 4.0 bar, preferably at an absolute ambient pressure between 1.0 bar and 4.0 bar.

Preferably, the pressure inside the sealed vessel during thermal treatment is lower than the pressure outside the sealed vessel.

The embodiments of the invention are illustrated by way of example and not in a manner whereby limitations arising from the figures are transferred or read into the patent claims. Identical reference signs in the figures indicate identical elements.

FIG. 1 shows a side view of a cam screw closure 1 with an annular sealing element 3, in part as a sectional view;

FIG. 2 shows a side view of cam screw rotary closure 1 with sealing element 3 on a vessel 5, in part as a sectional view;

Figure 2:
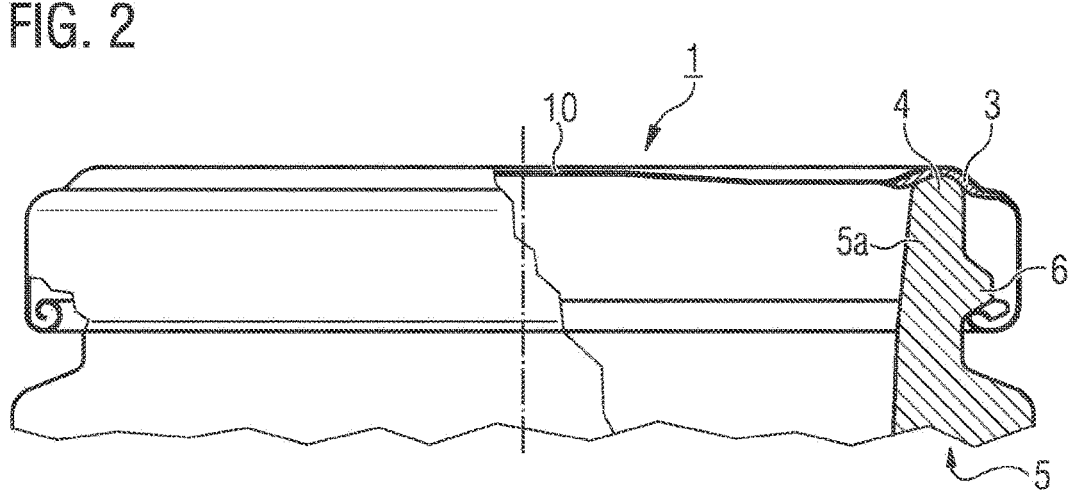
Figure 7:
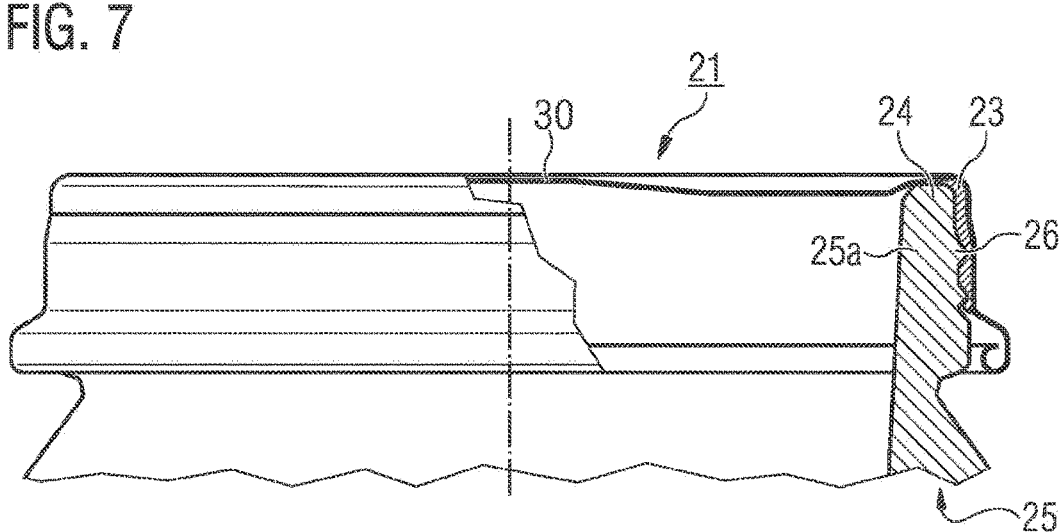
Figure 8:
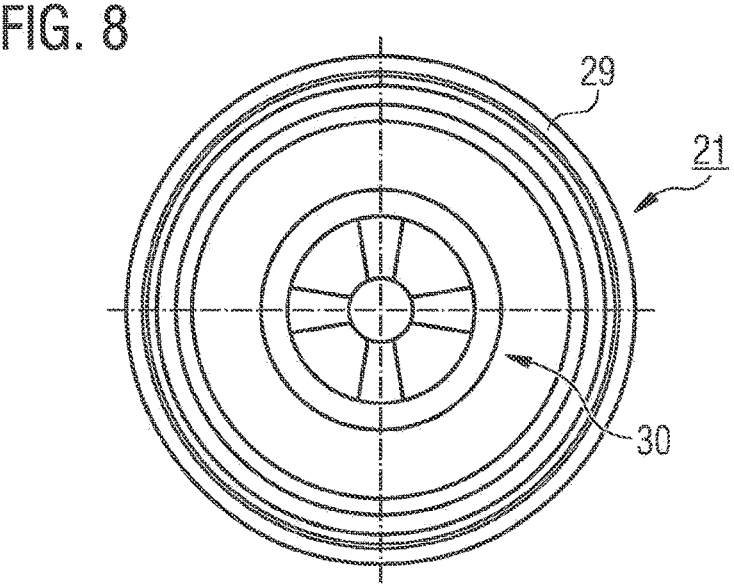
Figure 9:
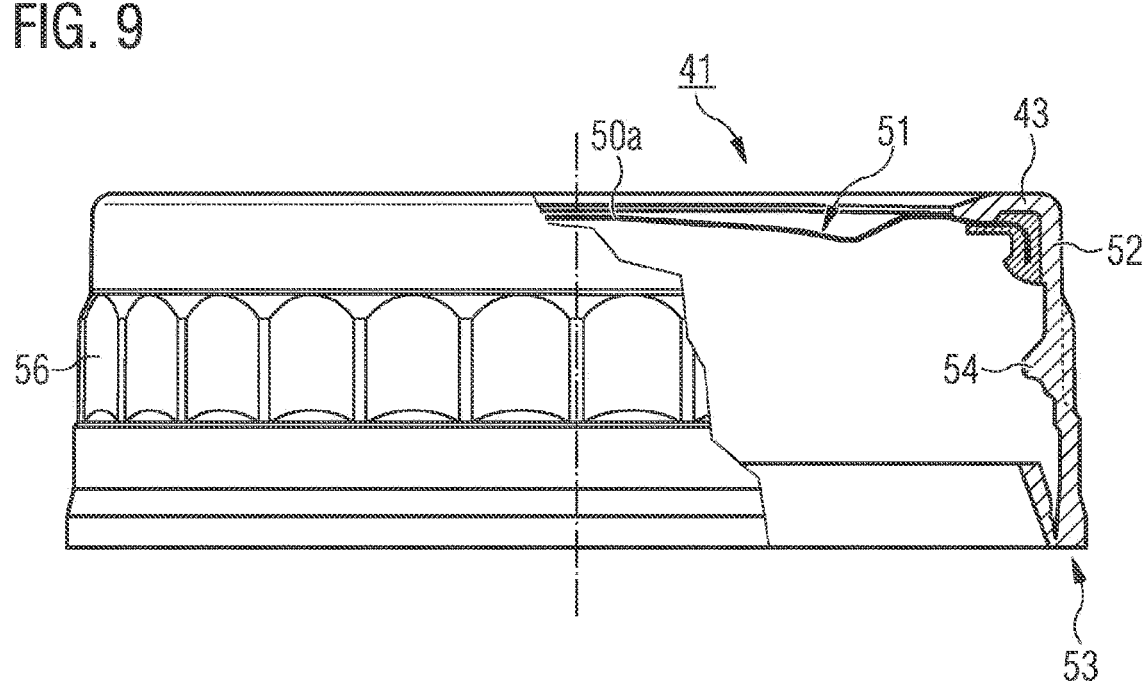
Figure 10:
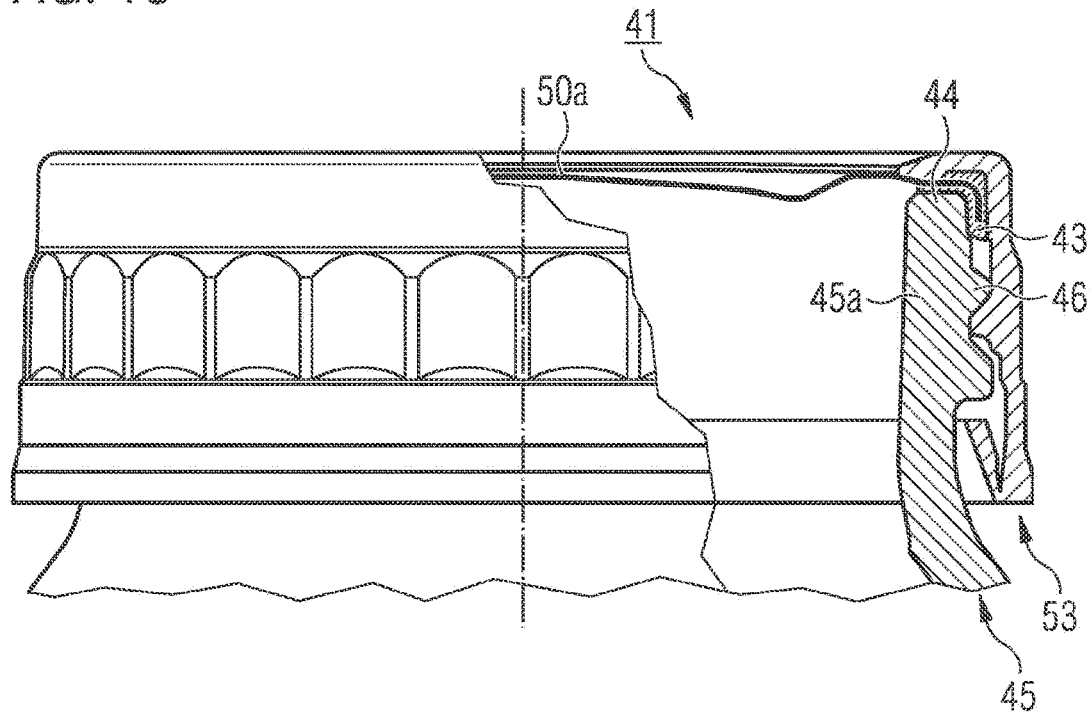
Figure 11:
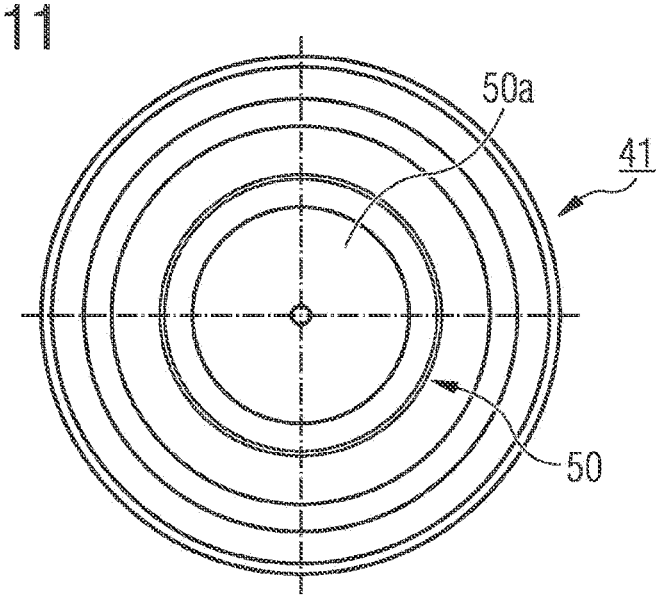
Figure 12:
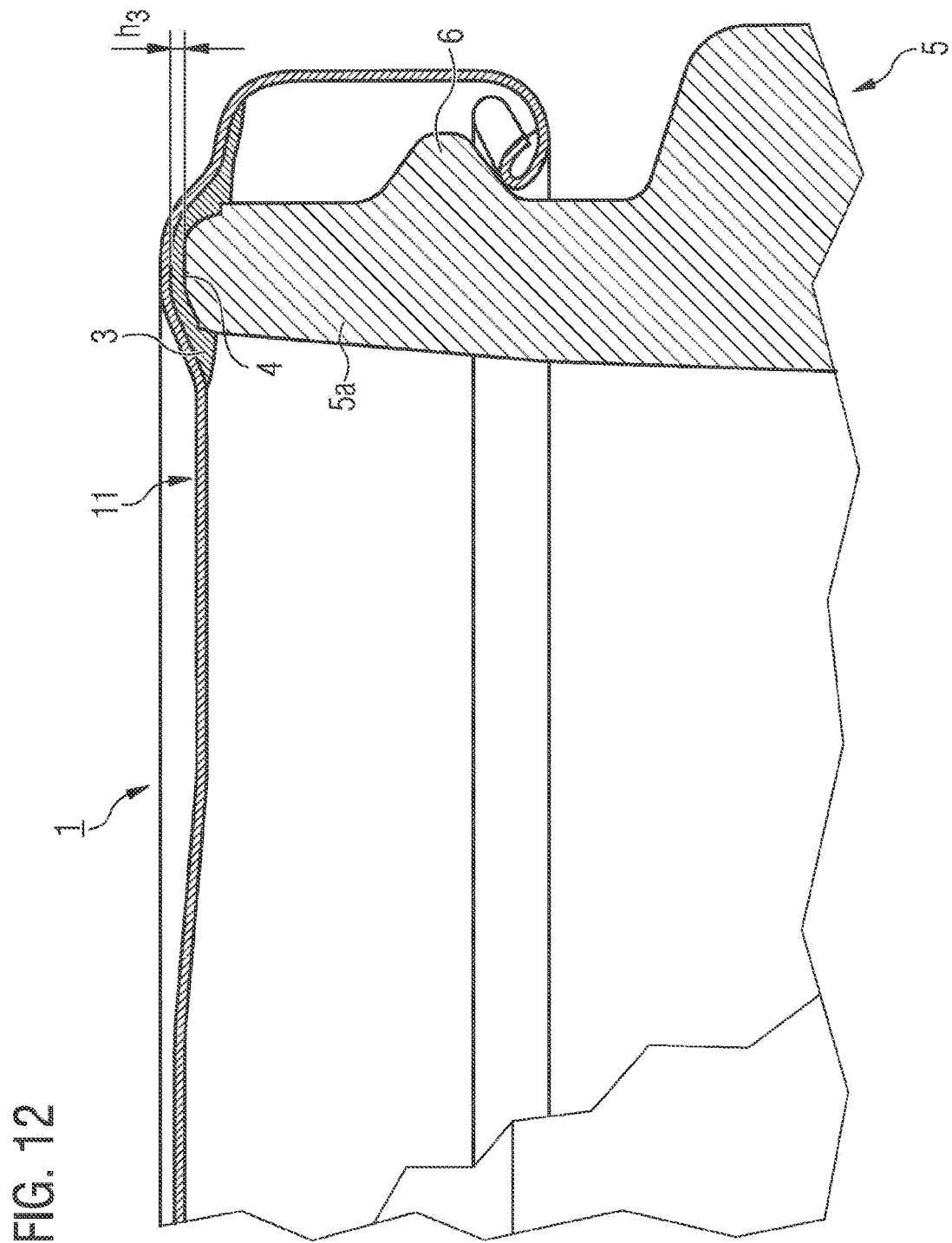

FIG. 7 shows a side view of PT closure 21 with sealing element 23 on a vessel 25, in part as a sectional view;

FIG. 8 shows a top view of PT closure 21;

FIG. 9 shows a side view of a composite fastener 41 (band guard) with a sealing element 43, in part as a sectional view;

FIG. 10 shows a side view of the composite closure 41 (band guard) with sealing element 43 on a vessel 45, in part as a sectional view;

FIG. 11 shows a top view of composite fastener 41 (band guard);

FIG. 12 shows an enlarged section of the cam screw closure of FIG. 2.

Figure 1:
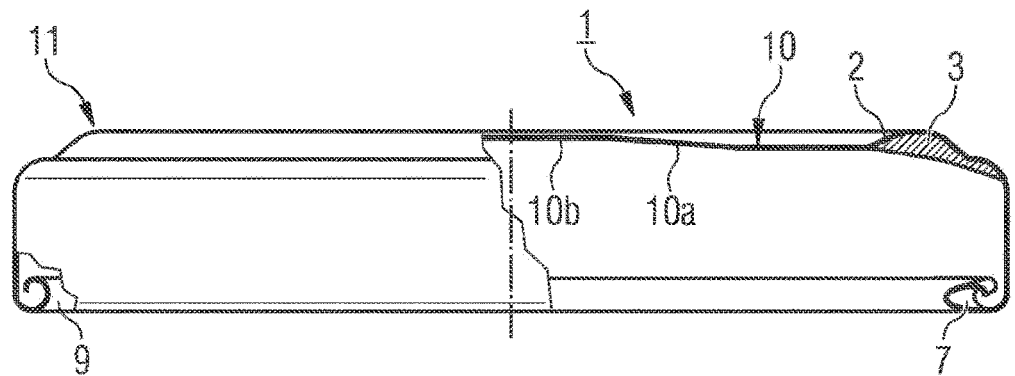
Figure 3:
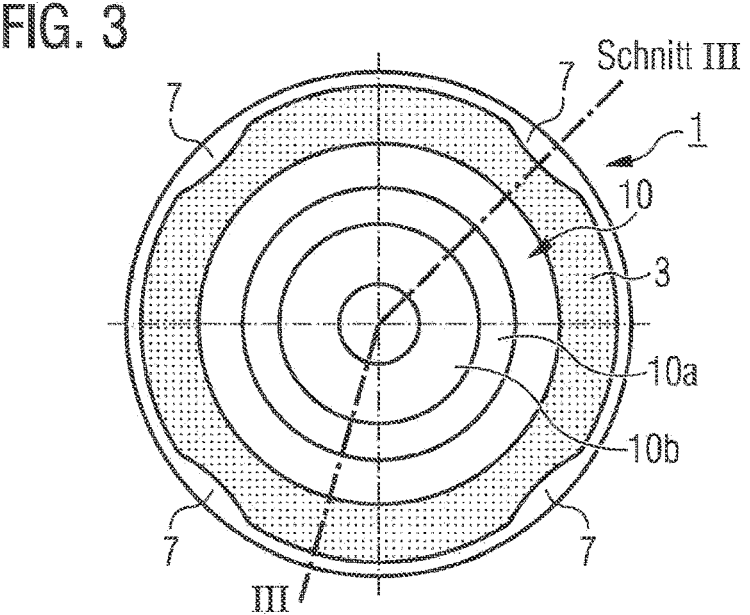
FIG. 3 shows cam screw closure 1 with sealing element 3 in a bottom view.

FIGS. 1 and 3 show a cam screw closure 1. Cam screw closure 1 includes a metallic support 11 and a sealing element 3. In the illustration of FIG. 2, cam screw closure 1 is applied to a vessel 5. A curl 9 is formed at the lower end of cam screw closure 1. Several cams 7 are formed circumferentially distributed from curl 9. Cams 7 are formed by an axial deformation of curl 9 and extend radially further toward the center of the cam screw closure 1 than curl 9. Cam screw closure 1 shown in FIGS. 1 to 3 includes four cams 7, which are evenly distributed around the circumference. The sections shown in part in FIGS. 1 and 2 correspond to section III-III in FIG. 3.

A channel 2 is formed in upper section 10 of carrier 11 near the radially outer end section of cam screw closure 1. Sealing element 3 is at least partially positioned in channel 2. In this embodiment, sealing element 3 is annular; in other embodiments, sealing element 3 may be disc-shaped, particularly if the diameter of the cam screw closure is small (e.g. at most 30 mm).

To mediate adhesion between metallic carrier 11 and sealing element 3, an adhesive lacquer is typically applied to the side of metallic carrier 11 that is in contact with sealing element 3.

In FIG. 2, cam screw closure 1 is applied to a vessel 5. Vessel 5 includes a vessel mouth 5a as the upper portion of vessel 5. The vessel mouth includes a thread 6 and an upper end 4 of vessel mouth 5a. Thread 6 is formed circumferentially in the area of vessel mouth 5a and extends circumferentially upwards or downwards (depending on the angle of view).

To apply cam screw closure 1 to a vessel 5, cams 7 are brought into contact with sections of thread 6, and cam screw closure 1 is rotated clockwise relative to vessel 5. Due to the configuration of thread 6 and the interaction of cams 7 with thread 6, upper end 4 of vessel mouth 5a moves toward sealing element 3 during the rotational movement of cam screw closure 1 relative to vessel 5. A further rotational movement of cam screw closure 1 causes upper end 4 of vessel mouth 5a to press into and deform sealing element 3 so that a portion of upper end 4 of vessel mouth 5a is covered by sealing element 3, thereby closing vessel 5 tightly. In particular, a tight closure of vessel 5 is necessary to withstand increased pressure during thermal treatment of closed vessel 5 at temperatures above 70° C., 90° C. or even above 120° C.

As shown in FIGS. 1 to 3, cam screw closure 1 includes a safety button 10b formed in upper portion 10 of carrier 11. Due to slope 10a in upper section 10 of carrier 11, safety button 10b tips toward the center of the vessel when there is a sufficiently large negative pressure in the vessel. Such a vacuum can be created by introducing water vapor into the vessel before closing the vessel with the closure.

If a consumer opens the vessel by removing the vessel closure, the pressure in the vessel rises to ambient pressure and safety button 10b tips away from the center of the vessel. The tipping of safety button 10b is accompanied by a characteristic sound, by which a consumer can recognise that there was a vacuum in the vessel before it was opened.

Figure 4:
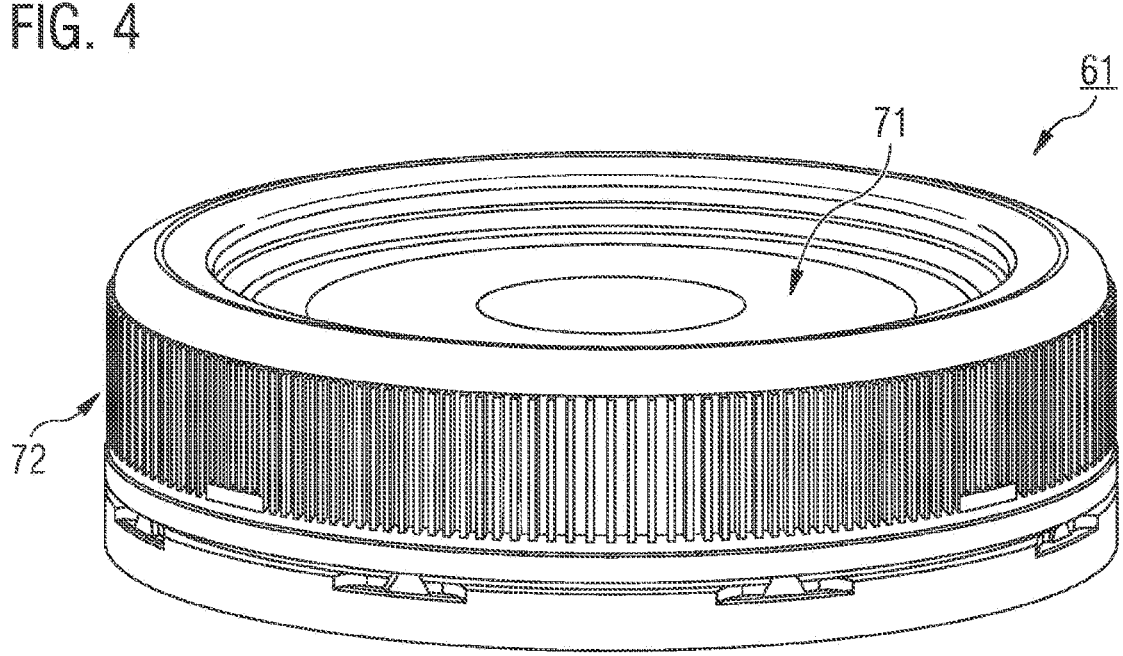
FIG. 4 shows an isometric view of a composite closure 61 (Combi-Twist)
Figure 5:
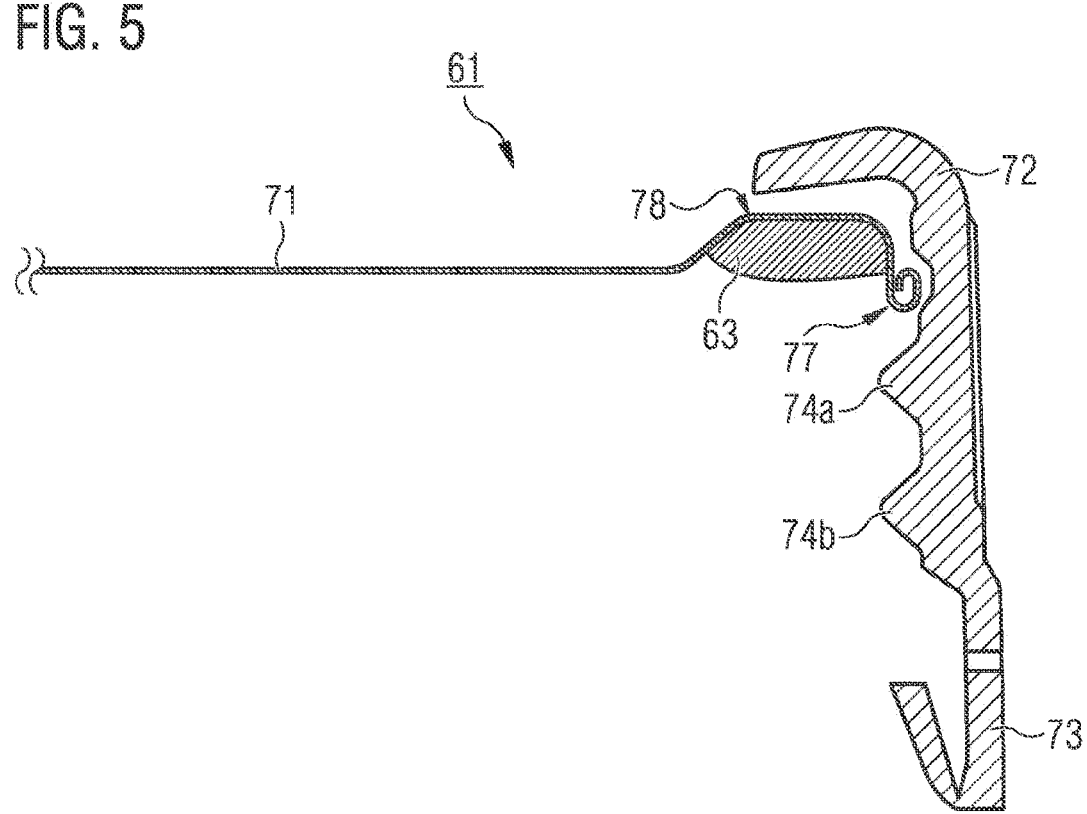
FIG. 5 shows a partial axial section of the composite closure 61 (Combi-Twist) of FIG. 4.

FIGS. 4 and 5 show a composite closure 61 (Combi-Twist) which, similar to cam screw closure 1 described above, can be attached to a vessel by a twisting motion and removed from the vessel via a twisting motion.

Composite fastener 61 includes a carrier with an upper metallic section 71 and a plastic section 72 in an L-shape. A channel 78 is formed near the radial end of metallic section 71 of the carrier and a curl 77 is formed at the radial end of metallic section 71. A sealing element is at least partially positioned in channel 78.

Several threaded elements 74a, 74b formed on the inside of plastic section 72 make contact with a mating thread in the region of the mouth of a vessel (not shown) to which composite closure 61 is to be attached. Furthermore, plastic section 72 of composite closure 61 includes a tamper-evident closure 73, which is similar in design to the tamper-evident closure shown in FIGS. 9 to 11 and is described in more detail with reference to FIGS. 9 to 11.

If composite closure 61 is screwed onto a vessel by a twisting motion, a similar interaction of the vessel mouth of the vessel with the sealing element of composite closure 61 results as described for cam screw closure 1.

Figure 6:
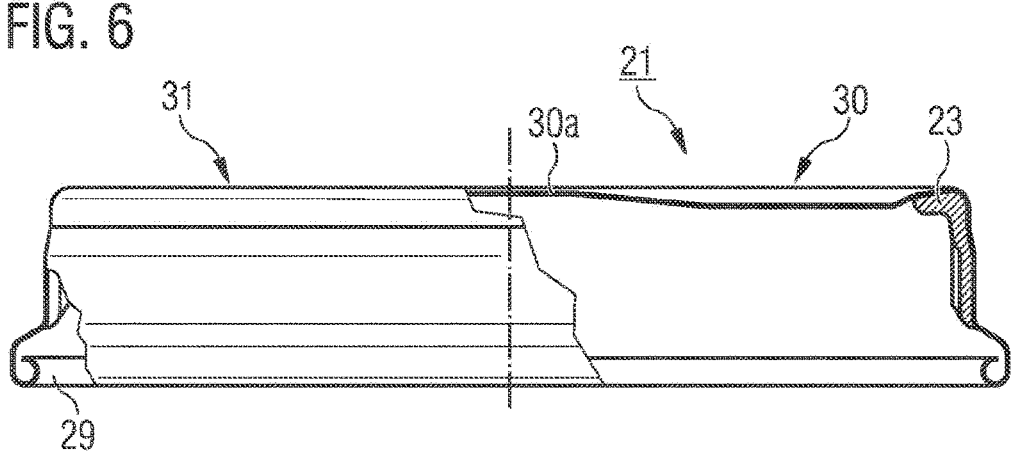
FIG. 6 shows a side view of a press-on twist-off closure 21 (PT closure) with a sealing element 23, in part as a sectional view.

FIGS. 6 to 8 show a press-on twist-off closure 21 (PT closure). PT fastener 21 includes a metallic carrier 31 with a curl 29 at the lower end of carrier 31 and a safety button 30a in upper section 30 of carrier 31.

A sealing element 23 is formed both in the region of upper section 30 of carrier 31 and to a considerable extent on the apron of the beam, which extends downward from upper section 30 of carrier 31. PT closure 21, unlike cam screw closure 1 and composite closure 61, is pressed onto vessel mouth 25a when applied to a vessel 25. While pressing onto vessel mouth 25a, sealing element 23 is sufficiently soft to elastically enclose threaded elements 26 of vessel mouth 25a. Typically for this purpose, sealing element 23 is treated with steam before PT closure 21 is attached to a vessel 5 to cause the necessary softness of sealing element 23. After sealing element 23 has cooled, a mating thread in the form of an inverse of threaded elements 26 of the vessel mouth is formed in sealing element 23.

An upper end 24 of vessel mouth 25a comes in contact with sealing element 23.

To open receptacle 25, PT closure 21 is removed from receptacle 25 by a twisting motion.

FIGS. 9 to 11 show a composite closure 41 (band guard) that works similar to PT closure 21 described above.

Composite closure 41 includes a carrier with a metallic section 51 and a plastic section 52, a tamper-evident closure 53 and a safety button 50a. Tamper-evident closure 53 is configured to be removed from remaining composite closure 41 when composite closure 41 is removed from a vessel 45 and serves to allow a consumer to verify that composite closure 41 has already been removed from vessel 45. Safety button 50a is designed and works similarly to safety button 10b of cam screw closure 1.

The plastic portion of composite closure 41 may include multiple axially extending indentations 56 to increase the stability of the closure.

A sealing element 43 is arranged in composite closure 41 so that it comes into contact with both metallic section 51 and plastic section 52. To close a vessel 45, composite closure 41 is pressed onto vessel mouth 45a of vessel 45 so that at least upper end 44 of vessel mouth 45a comes into contact with sealing element 43.

Plastic section 52 of the carrier includes multiple offset projections 54 that interact with threaded elements 46 of vessel mouth 45a. To open a vessel 45 closed by composite closure 41, composite closure 41 may be rotated relative to vessel 45.

Distance h3 of a sealing element 3 between an upper end 4 of a vessel mouth 5a of a vessel 5 and the lower side of a support 11 of closure 1 is shown in FIG. 12, looking toward a cam screw closure 1, and described herein. Similarly, the distance (height) h3 must be determined for other closure types as well.

Sealing element 3 clamped between vessel mouth 5 and support 11 of vessel closure 1 has a height h3 given when a vessel 5 is closed with closure 1. If height h3 is too low, there is a risk of sealing element 3 being cut through, which may impair the tightness of sealed vessel 5. If height h3 is too large, the tightness of the sealed vessel is impaired because the contact surface between upper end 4 of vessel mouth 5a and sealing element 3 is not sufficiently large. In order to achieve a suitable impression of upper end 4 of vessel mouth 5a into the sealing element, the composition of sealing element 3 is decisive.

EXAMPLES

Examples of polymer compositions for sealing elements in a vessel closure are shown in Tables 1, 2 and 3. The examples are labelled with Ex. and a consecutive number for the respective example.

The component designations shown in the tables stand for . . . .

| | |
|---|---|
| PAO-5 | Polyalphaolefin with a kinematic viscosity of about 5 cSt at 100° C., |
| PAO-65 | Polyalphaolefin with a kinematic viscosity of about 65 cSt at 100° C., |
| PAO-150 | Polyalphaolefin with a kinematic viscosity of about 150 cSt at 100° C., |
| PAO-300 | Polyalphaolefin with a kinematic viscosity of about 300 cSt at 100° C., |
| C4C2 | Alpha-butene-ethylene copolymer with an alpha-butene content of more than 50 mol %, |
| C4C3 | Alpha-butene-ethylene copolymer with an alpha-butene content of more than 50 mol %, |
| C2 | Ethene homopolymer (LDPE), |
| C3C2 | Propene-ethene copolymer with a propene content of more than 50 mol %, |
| C3C6 | Propene-alpha-hexene copolymer with a propene content of more than 50 mol %, |
| C4 | Alpha-butene homopolymer. |

The polyalphaolefins (PAO-5, PAO-65, PAO-150, PAO-300) are commercially available from Chevron Phillips or from ExxonMobil (e.g. SpectraSyn series).

The alpha-butene-ethylene copolymer has a Shore A hardness of 60 and a density of 0.870 g $cm^{-3}$.

The alpha-butene-propene copolymer has a Shore A hardness of 87 and a density of 0.890 g $cm^{-3}$.

The ethene homopolymer exhibits a Shore D hardness of 48 and a density of 0.928 g $cm^{-3}$.

The density of the propene-ethylene copolymer is 0.900 g $cm^{-3}$.

The propene-alpha-hexene copolymer exhibits a density of 0.900 g $cm^{-3}$.

The alpha-butene homopolymer has a Shore D hardness of 54.

TABLE 1

| | Ex. 1 | Ex. 2 | Ex. 3 | Ex. 4 | Ex. 5 | Ex. 6 | Ex. 7 |
|---|---|---|---|---|---|---|---|
| Component, % by weight | | | | | | | |
| PAO-5 | 4.8 | 9.1 | 16.7 | | | | 9.1 |
| PAO-65 | | | | 9.1 | | | |
| PAO-150 | | | | | 9.1 | | |
| PAO-300 | | | | | | 9.1 | |
| C4C2 | 68.5 | 65.4 | 59.9 | 65.4 | 65.4 | 65.4 | |
| C4C3 | | | | | | | 87.2 |
| C2 | 15.2 | 14.5 | 13.3 | 14.5 | 14.5 | 14.5 | |
| C3C2 | 7.6 | 7.3 | 6.7 | 7.3 | 7.3 | 7.3 | |
| C3C6 | | | | | | | |
| C4 | | | | | | | |
| Additive | 3.9 | 3.7 | 3.4 | 3.7 | 3.7 | 3.7 | 3.7 |
| Property | | | | | | | |
| Coefficient of friction, dimensionless | 0.31 | 0.33 | 0.39 | 0.36 | 0.23 | 0.18 | 0.28 |
| Total migration, mg $cm^{-2}$ | 2.14 | 3.27 | 5.11 | 1.35 | 1.15 | 0.99 | 2.90 |
| Oxygen transmission rate $cm^3$ $m^{-2}$ $d^{-1}$ $bar^{-1}$ | 662 | 809 | 1162 | 732 | 681 | 650 | 680 |

TABLE 2

| | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|
| Component % by weight | | | | | | | | | |
| PAO-300 | 20.0 | 30.0 | 40.0 | 5.0 | 10.0 | 20.0 | 10.0 | 10.0 | 10.0 |
| C4C2 | | | | 90.9 | 85.9 | 75.9 | 61.9 | 61.9 | 61.9 |
| C4C3 | 75.9 | 65.9 | 55.9 | | | | | | |

TABLE 2-continued

| | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|
| C2 | | | | | | | 24.0 | | |
| C3C6 | | | | | | | | 24.0 | |
| C4 | | | | | | | | | 24.0 |
| Additive % by weight | 4.1 | 4.1 | 4.1 | 4.1 | 4.1 | 4.1 | 4.1 | 4.1 | 4.1 |

TABLE 3

| | Ex. 17 | Ex. 18 | Ex. 19 | Ex. 20 | Ex. 21 | Ex. 22 | Ex. 23 | Ex. 24 |
|---|---|---|---|---|---|---|---|---|
| Component % by weight | | | | | | | | |
| PAO-5 | 9.1 | 16.7 | 9.1 | 16.7 | | | | |
| PAO-300 | | | | | 5.0 | 10.0 | 30.0 | 40.0 |
| C4C2 | 65.4 | 59.9 | 65.4 | 59.9 | | | 65.9 | 55.9 |
| C4C3 | | | | | 90.9 | 85.9 | | |
| C2 | 14.5 | 13.3 | 14.5 | 13.3 | | | | |
| C3C6 | 7.3 | 6.7 | | | | | | |
| C4 | | | 7.3 | 6.7 | | | | |
| Additive % by weight | 3.7 | 3.4 | 3.7 | 3.4 | 4.1 | 4.1 | 4.1 | 4.1 |

Generally, no specific component is necessarily present in any of the polymer compositions or the polymer composition. Specifically, an increased occurrence of a component in the examples is not an indication that this component must necessarily be included in the polymer composition. Instead, components can be omitted from the compositions of the examples or replaced by other component(s). Components may also be added.

The invention claimed is:

1. Vessel closure with a sealing element, whereby the sealing element comprises a polymer composition and the polymer composition comprises (a) a polyalphaolefin with a kinematic viscosity, determined according to ASTM D445/ISO 3104, of at least 4 cSt, at a temperature of 100° C., and a dropping point, determined according to ASTM 5950, of at most −10° C.; and (b) up to 95% by weight of a second polyolefin,
wherein the polymer composition is free of a copolymer with styrene as a comonomer.

2. Vessel closure according to claim 1, whereby the polyalphaolefin has a kinematic viscosity at a temperature of 100° C., determined according to ASTM D445/ISO 3104, between 4 cSt and 1500 cSt.

3. Vessel closure according to claim 1, whereby the polyalphaolefin has a dropping point, determined according to ASTM 5950, of at most −20° C.

4. Vessel closure according to claim 1, whereby the polyalphaolefin has a density, determined according to ASTM D4052, of up to 0.860 g per cm$^3$.

5. Vessel closure according to claim 1, whereby the polyalphaolefin has an average molecular weight Mw, determined according to DIN 55672-1, of at least 440 Da.

6. Vessel closure according to claim 1, whereby the polyalphaolefin has been prepared using a metallocene catalyst.

7. Vessel closure according to claim 1 whereby the polyalphaolefin is present in the polymer composition at a level of up to 65% by weight.

8. Vessel closure according to claim 1, whereby the second polyolefin has a Shore A hardness, determined according to DIN ISO 7619-1 at 23° C., of at most 90.

9. Vessel closure according to claim 1, whereby the second polyolefin is a plastomer or an elastomer with a density, determined according to DIN EN ISO 1183-1, of less than 0.860 g per cm$^3$.

10. Vessel closure according to claim 1, whereby the second polyolefin is a (random) copolymer comprising alpha-butene and a $C_2$, $C_3$ or $C_5$ to $C_{16}$ (alpha-)olefin as comonomers.

11. Vessel closure according to claim 1, whereby the second polyolefin is a (random) copolymer comprising propene and a $C_2$, $C_4$ or $C_5$ to $C_{16}$ (alpha-)olefin as comonomers.

12. Vessel closure according to claim 1, whereby the second polyolefin is a (random or block) copolymer comprising ethene and a $C_5$ to $C_{16}$ (alpha-)olefin as comonomers.

13. Vessel closure according to claim 1, whereby the second polyolefin is present in the polymer composition in a proportion of at most 80% by weight.

14. Vessel closure according to claim 1, whereby the polyalphaolefin is a homopolymer or a copolymer wherein the polyalphaolefin comprises a $C_3$ to $C_{22}$ alpha-olefin as a (co)monomer.

15. Vessel closure according to claim 14, whereby the polyalphaolefin includes a $C_6$ to $C_{14}$ alpha-olefin.

16. Vessel closure with a sealing element, whereby the sealing element comprises a polymer composition and the polymer composition comprises
   (a) a polyalphaolefin with a kinematic viscosity, determined according to ASTM D445/ISO 3104, of at least 4 cSt, at a temperature of 100° C., and a dropping point, determined according to ASTM 5950, of at most −10° C.; and
   (b) between 65% and 95% by weight of a second polyolefin, wherein the second polyolefin is a copolymer comprising alpha-butene and a $C_2$, $C_3$ or $C_5$ to $C_{16}$ (alpha-)olefin as comonomers.

17. Vessel closure with a sealing element, whereby the sealing element comprises a polymer composition and the polymer composition comprises
   (a) a polyalphaolefin with a kinematic viscosity, determined according to ASTM D445/ISO 3104, of at least 4 cSt, at a temperature of 100° C., and a dropping point, determined according to ASTM 5950, of at most −10° C.; and
   (b) up to 95% by weight of a second polyolefin, wherein the second polyolefin is a copolymer comprising propene, a $C_2$ olefin and a $C_4$ (alpha-)olefin as comonomers.

* * * * *